United States Patent [19]
Egasaki et al.

[11] Patent Number: 5,564,640
[45] Date of Patent: Oct. 15, 1996

[54] DRAG DEVICE FOR SPINNING REEL

[75] Inventors: Takashi Egasaki; Eiji Shinohara, both of Tokyo, Japan

[73] Assignee: Daiwa Seiko, Inc., Tokyo, Japan

[21] Appl. No.: 224,537

[22] Filed: Apr. 7, 1994

[30] Foreign Application Priority Data

Apr. 7, 1993 [JP] Japan ................. 5-023137 U

[51] Int. Cl.$^6$ ............................................. A01K 89/027
[52] U.S. Cl. .................................... 242/246; 242/319
[58] Field of Search .......................... 242/244, 246, 242/319

[56] References Cited

U.S. PATENT DOCUMENTS

| | | | |
|---|---|---|---|
| 2,758,801 | 8/1956 | Bonanno | 242/246 |
| 4,629,141 | 12/1986 | Darden | 242/244 |
| 5,149,007 | 9/1992 | Saito | 242/246 |
| 5,362,012 | 11/1994 | Ban | 242/246 |

*Primary Examiner*—Katherine Matecki
*Attorney, Agent, or Firm*—Longacre & White

[57] ABSTRACT

A drag device which does not require a large number of parts, is easy to assemble, is highly corrosion resistant and can keep its commercial value. Brake plates and a friction plate provided in the drag device are inserted into a central recessed portion formed in a spool. A pressure member is non-rotatably fitted to the outer periphery of a rotation preventive portion of a leading end small diameter portion formed in a spool shaft, while a nut mounted to an operation member is threadingly engaged with a threaded portion formed in the leading end portion of the small diameter portion. After the pressure member and operation member are assembled together, a removal preventive member is superimposingly assembled to a stepped portion provided in the operation member and an engaging portion is secured by means of the elastic deformation of a securing portion, so that the pressure member is secured to the operation member rotatably but unremovably.

5 Claims, 6 Drawing Sheets

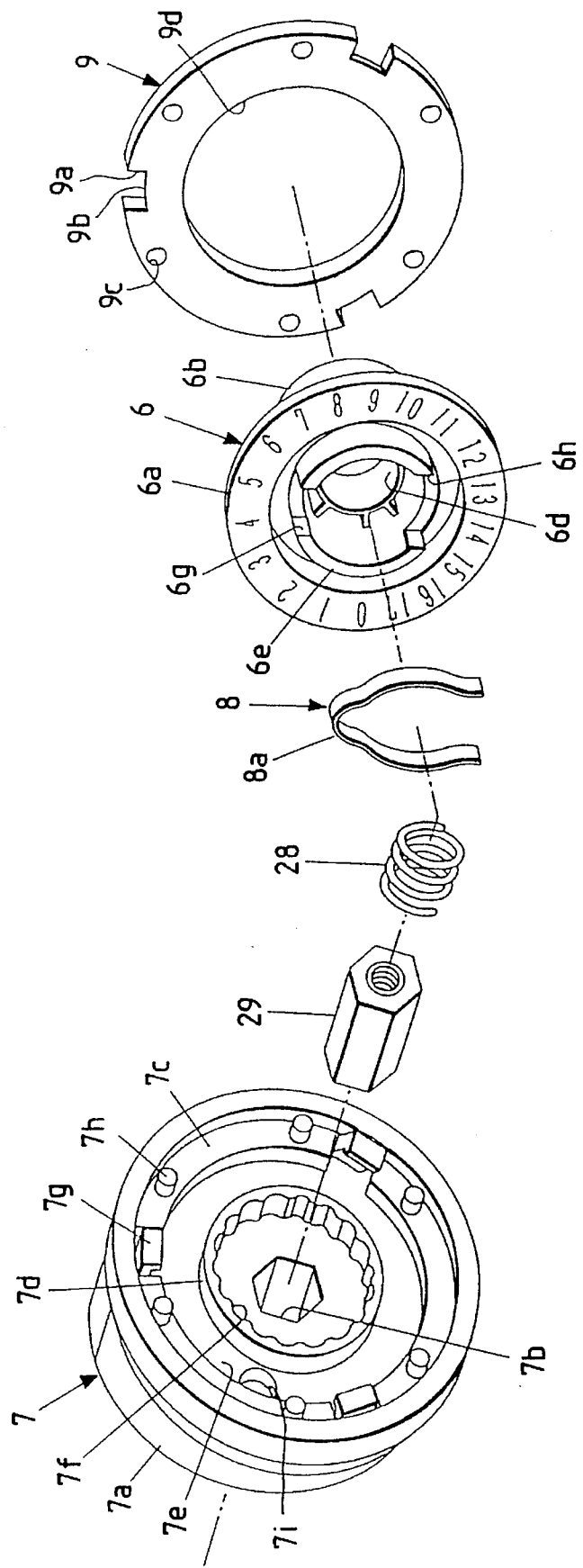

5,564,640

DRAG DEVICE FOR SPINNING REEL

BACKGROUND OF THE INVENTION

The present invention relates to a drag device for use in a spinning reel for fishing.

U.S. Pat. No. 5,149,007 discloses a drag device of a type, wherein a pressure member for pressing brake plates provided in the front portion of a spool of a spinning reel is retained rotatably but unremovably onto an operation member which is threadingly engaged with the leading end portion of a spool shaft.

Since the drag device uses screws to attain the unremovably retaining purpose, the number of parts is large and the device is hard to assemble, which results in the expensive manufacturing cost.

Further, the threadingly engaging portion of the operation member with which the screws are engaged is likely to crack and, in the fishing under a severe condition in which seawater and water are easy to attach to the drag device, the screws rust so that the commercial value of the drag device is lowered.

SUMMARY OF THE INVENTION

The present invention aims at eliminating the above problems found in the above-mentioned conventional drag device. Accordingly, it is an object of the invention to provide a drag device for use in a fishing spinning reel which does not require the large number of parts, is easy to assemble, is good in corrosion resistance and can keep its commercial value for a long time use.

In attaining the above object, according to the invention, there is provided a drag device for use in a fishing spinning reel arranged such that a pressure member for pressing a brake plate provided in the front portion of a spool is fitted with a spool shaft axially movably but unrotatably and the front portion of the pressure member is rotatable with respect to an operation member threadingly engageable with the spool shaft, in which a securing portion is formed in the operation member on the pressure member side thereof, and an engaging portion formed in a removal preventive member superimposed on the rear surface of the front portion of the pressure member is secured by means of elastic deformation to the securing portion of the operation member to thereby secure the pressure member to the operation member rotatably but unremovably.

Also, according to the invention, there is provided a drag device for use in a fishing spinning reel arranged such that a pressure member for pressing a brake plate provided in the front portion of a spool is fitted with a spool shaft axially movably and unrotatably and the front portion of the pressure member is rotatable with respect to an operation member threadingly engageable with the spool shaft, in which a securing portion is formed in the operation member on the pressure member side thereof, and an engaging portion formed in the rear surface of the outer peripheral portion of the front portion of the pressure member is secured rotatably and unremovably by means of the elastic deformation of the securing portion formed in the operation member. This securing portion preferably takes the form of hooked projections provided on the operation member.

BRIEF DESCRIPTION OF THE DRAWINGS

FIG. 5 is an enlarged perspective view of the drag device;

DETAILED DESCRIPTION OF THE PREFERRED EMBODIMENTS

Figure 1:
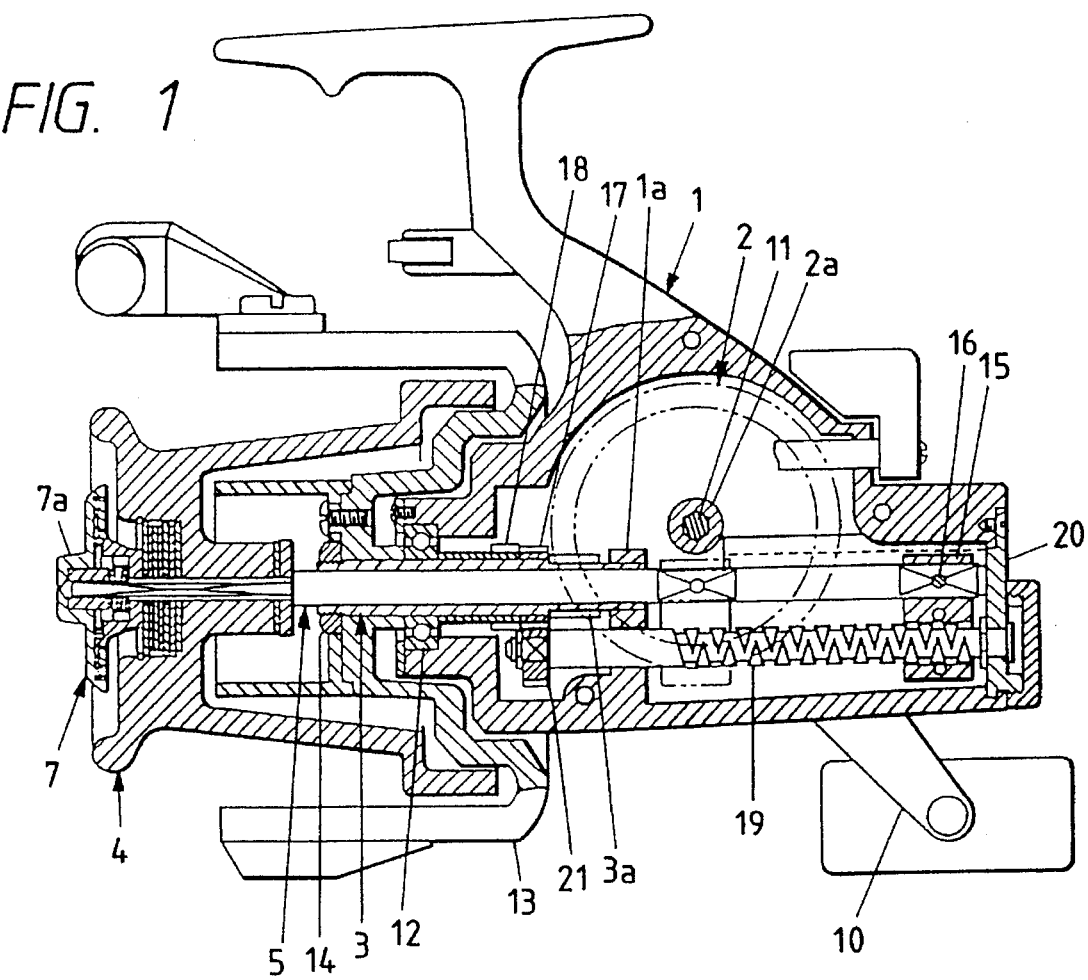
FIG. 1 is a sectional side view of the main portions of a first embodiment of a drag device for use in a fishing spinning reel.
Figure 3A:
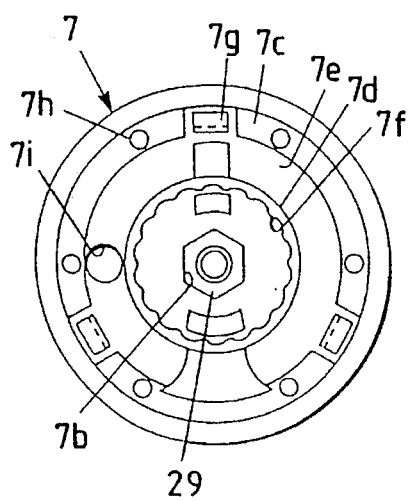
FIG. 3(a) is a back view of an operation member.
Figure 3B:
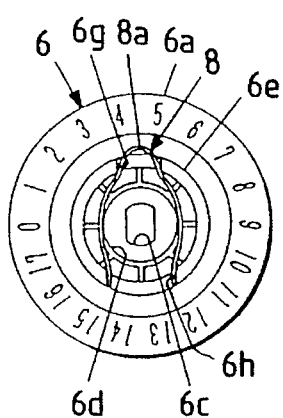
FIG. 3(b) is a front view of a pressure member.
Figure 3C:
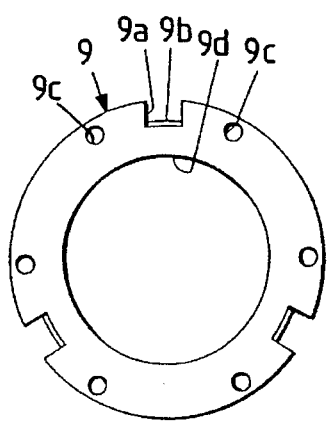
FIG. 3(c) is a back view of a removal preventive member.
Figure 2:
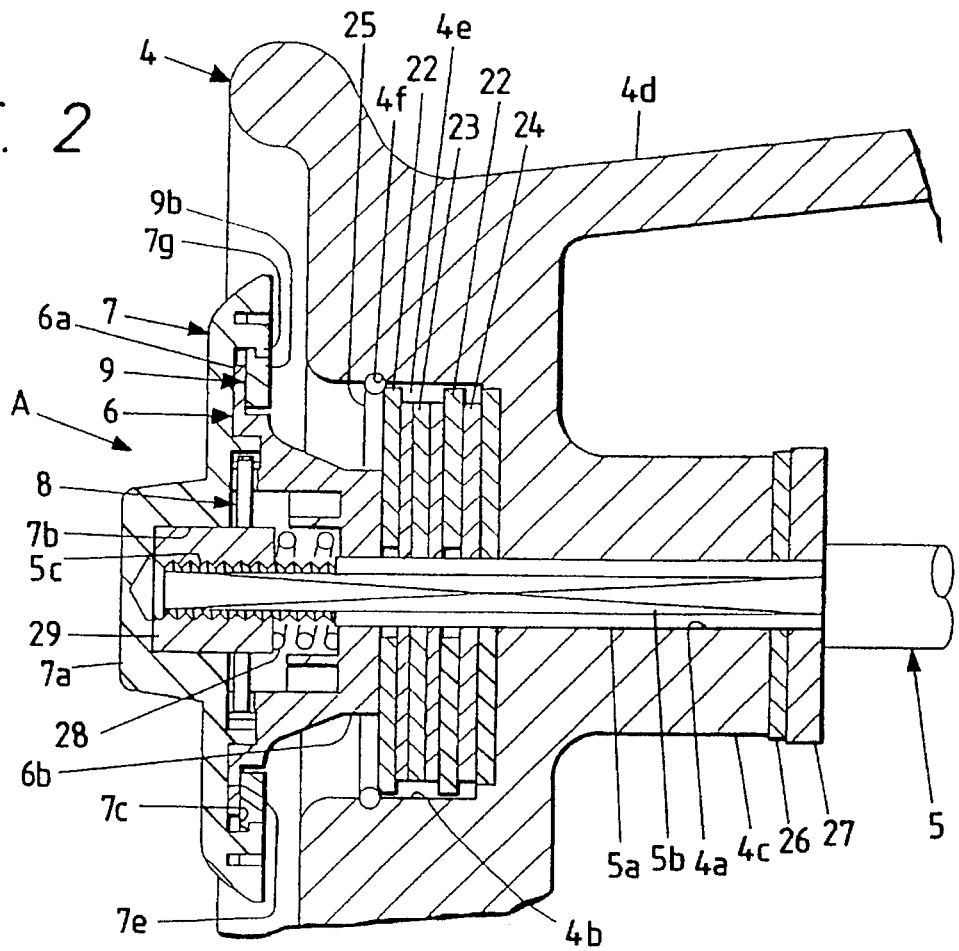
FIG. 2 is an enlarged sectional side view of the drag device disposed within a spool.
Figure 4:
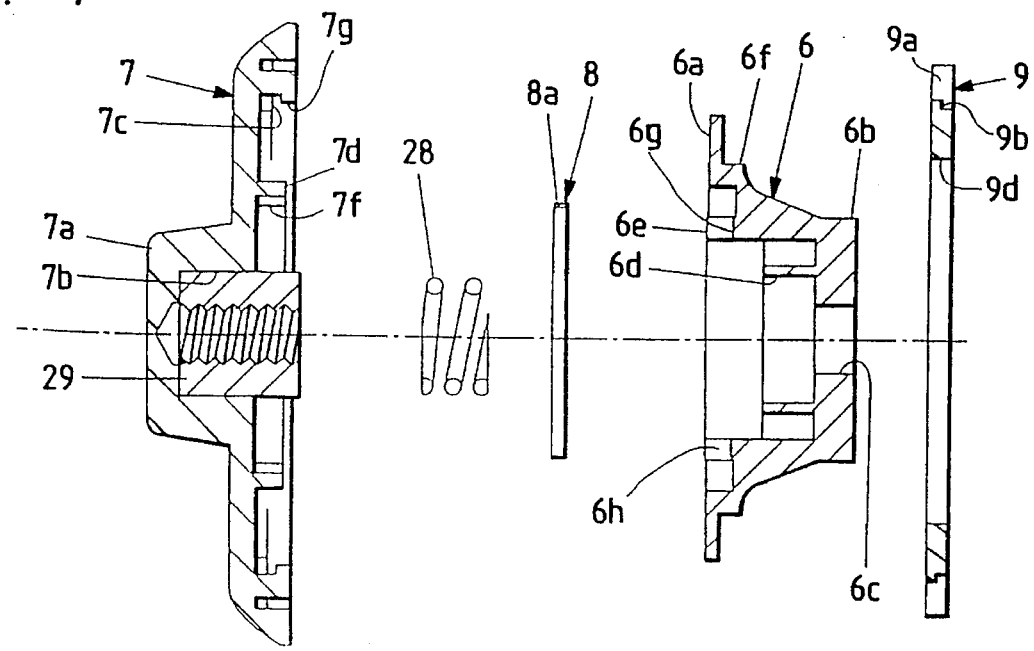
FIG. 4 is an exploded sectional side view of the main portions of the drag device.

Now, description will be given below of the invention by way of the illustrated embodiments thereof. FIGS. 1 to 5 respectively shows a first embodiment of a drag device for use in a fishing spinning reel according to the invention. In particular, FIG. 1 is a sectional side view of the main portions of a fishing spinning reel, FIG. 2 is an enlarged sectional side view of the drag device disposed in a spool, FIG. 3 (a) is a back view of an operation member, FIG. 3 (b) is a front view of a pressure member, FIG. 3 (c) is a back view of a removal preventive member, FIG. 4 is an exploded sectional side view of the main portions of the drag device.

The fishing spinning reel is arranged such that a rotary shaft 2a of a drive gear 2 is journaled by a bearing (not shown) on the two sides of a reel main body and a handle shaft 11 with a handle 10 fixed thereto is inserted into and fitted with a central polygonal hole formed in the central portion of the rotary shaft 2a in such a manner that the handle shaft 11 is interchangeable right and left. A rotary shaft cylinder 3 is rotatably journaled in the front portion of the reel main body 1 by a bearing 12 and is also projected out forwardly from the reel main body 1. A rotor 13 is fitted with the outer periphery of the rotary shaft cylinder 3 existing forwardly of the bearing 12 and is also fixed thereto by a nut 14. The base end portion of the rotary shaft cylinder 3 is rotatably journaled by a bearing portion 1a and the drive gear 2 meshes with a pinion 3a formed integrally in the front portion of the base end portion, so that the rotor 13 can be rotated in linking with the rotation of the handle 10. A spool shaft 5 with a spool 4 mounted to the leading end thereof is slidably inserted into a central hole formed in the rotary shaft cylinder 3 in such a manner that it can be reciprocated back and forth, a piece member 15 is fixed to the end portion of the spool shaft 5 by a screw 16.

Forwardly of the pinion 3a of the rotary shaft cylinder 3 located within the reel main body 1, a linking gear 17 and a reversal preventive ratchet wheel 18 are unrotatably fitted with the rotary shaft cylinder 3. Within the reel main body 1, a traverse cam shaft 19 is supported in parallel to the spool shaft 5 by the bearing portion 1a and a side plate 20 mounted to the rear portion of the reel main body 1. A small gear 21 is unrotatably fitted with the leading end portion of the traverse cam shaft 19 and the small gear 21 is in mesh with the linking gear 17. The piece member 15 is fitted with the traverse cam shaft 19 and an engaging piece (not shown) provided in the piece member 15 is in engagement with the traverse cam groove formed on the shaft 19.

The spool 4 comprises a through hole 4a formed through the central portion thereof into which the leading end small diameter portion 5a of the spool shaft 5 is inserted, a recessed portion 4b into which the brake plate 22, brake plate 23 and friction plate 24 of the drag device A are inserted, a shaft cylinder portion 4c which is a rear part of the central portion, and a winding barrel portion 4d around which a fishing line is to be wound. In the recessed portion 4b, there are formed a projecting portion 4e with which the outer peripheral portion of the brake plate 22 is engaged, and a recessed portion 4f with which a ring 25 for prevention of removal of the brake plate is engaged. A rotation preventive portion 5b is provided in the outer peripheral portion of the leading end small diameter portion 5a of the spool shaft 5, while a threaded portion 5c is formed in the leading end portion of the small diameter portion 5a. The brake plate 22, brake plate 23 and friction plate 24 are fitted with the outer peripheral portion of the leading end small diameter portion 5a of the spool shaft 5, while the brake plate 23 is prevented against rotation by the rotation preventive portion 5b. When the spool 4 is fitted with the leading end small diameter portion 5a of the spool shaft 5, a friction plate 26 and a brake plate 24 are inserted between the leading end small diameter portion 5a and the shaft cylinder portion 4c.

The pressure member 6 of the drag device A is unrotatably fitted with the outer peripheral portion of the rotation preventive portion of the leading end small diameter portion 5a of the spool shaft 5, and springs 28 are inserted between them. A nut 29 mounted to the operation member 7 of the drag device A is in thread engagement with the threaded portion 5c of the leading end small diameter portion 5a of the spool shaft 5.

The pressure member 6 includes a flange portion 6a on the surface of which figures are displayed, a cylinder portion with a bottom 6b, an oval-shaped through hole 6c formed in the bottom of the cylinder portion with a bottom 6b, a recessed portion 6d into which the springs 28 are inserted, a cylinder portion 6e projected forwardly, and a stepped portion 6f provided on the back surface of the flange portion 6a. The cylinder portion 6e includes recessed portions 6g and 6h which are respectively formed on the end face of the cylinder portion 6e. A click spring 8 formed in a modified Ω-like shape is fitted into the recessed portions 6g and 6h.

The operation member 7 includes a knob portion 7a provided on the outside of the central portion thereof, a hole portion 7b which is formed inside the knob portion 7a and into which the nut 29 can be fitted unrotatably, a stepped portion 7c provided inside the back surface thereof, a cylinder portion 7d provided projectingly on the back surface thereof, a recessed portion 7e formed outside the cylinder portion 7d, an undulated portion 7f provided on the inner peripheral portion of the cylinder portion 7d, a plurality of securing portions or hooked projections 7g respectively projected on the back surface thereof, pin-like projections 7h provided right and left in the securing portions 7g, and a window hole 7i for display of the above-mentioned figures.

The removal preventive member 9 includes a plurality of recessed portions 9a in each of which an engaging portion 9b is provided. The engaging portions 9b are respectively secured by the securing portions 7g by means of the elastic deformation thereof. Right and left of the engaging portions 9b of the removal preventive member 9, there are formed through holes 9c into which the projections 7h are respectively fitted. The removal preventive member 9 includes a through hole 9d which is formed in the central portion thereof and into which the stepped portion 6f provided in the pressure member 6 can be fitted.

When the pressure member 6, operation member 7 and removal preventive member 9 of the drag device A are assembled together, the springs 28 are inserted into the recessed portion 6d in the pressure member 6, the click spring 8 is fitted into the recessed portions 6g and 6h, and the flange portion 6a is fitted into the recessed portion 7e formed in the operation member 7. At that time, a projecting portion 8a provided in the click spring 8 is engaged with the undulated portion 7f formed in the operation member 7. After the pressure member 6 and operation member 7 are assembled together, the removal preventive member 9 is assembled superimposingly to the stepped portion 7c of the operation member 7, the projection 7h is fitted into the through hole 9c, and the engaging portion 9b is secured by means of the elastic deformation of the securing portion 7g, so that the pressure member 6 can be secured to the operation member 7 rotatably but unremovably. In the pressure member 6 and operation member 7 of the drag device A assembled, a nut 29 is in threaded engagement with a threaded portion 5c formed in the spool shaft 5 which is projected out from the front surface of the spool 4.

Referring now to the operation of the above-mentioned fishing spinning reel, if the handle 10 is rotated, then the drive gear 2 is rotated and the rotary shaft cylinder 3 is rotated through the pinion 3a, so that the rotor 13 can be rotated. Further, as a result of the above rotation, the traverse cam shaft 19 is also rotated through the linking gear 17 and small gear 21 to thereby reciprocate the piece member 15 and spool shaft 5 back and forth.

To adjust the braking force of the drag device, the knob portion 7a of the operation member 7 is grasped and rotated by hand. The rotation of the knob portion 7a presses the end face of the cylinder portion with a bottom 6b of the pressure member 6 against the brake plate 22 by means of the threaded engagement between the nut 29 and threaded portion 5c, so that the braking force of the drag device can be adjusted.

As described above, according to the structure of the drag device for use in a fishing spinning reel, assembling of the pressure member 6, operation member 7 and removal preventive member 9 is achieved by securing the engaging portion 9b of the removal preventive member 9 to the securing portion 7g of the operation member 7. Thanks to this, the present drag device is very easy to assemble, requires a reduced number of parts and does not use any corrosive part on the outside thereof to enhance the corrosion resistance thereof, so that the drag device can keep its commercial value.

Figure 6A:
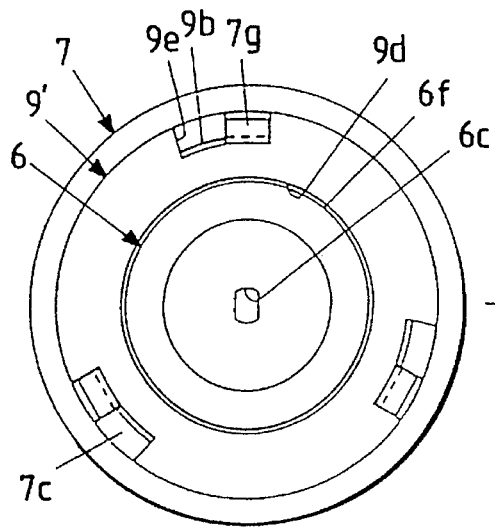
FIG. 6(a) is a back view of a second embodiment of the drag device when a pressure member and a removal preventive member are superimposed on an operation member.
Figure 6B:
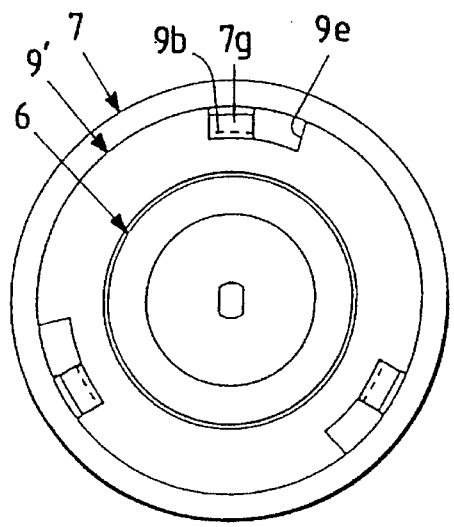
FIG. 6(b) is a back view of the second embodiment of the drag device when a removal preventive member is rotatably secured to an operation member.

Now, referring to FIG. 6, there is shown a second embodiment of a drag device for use in a fishing spinning reel according to the invention. In particular, FIG. 6 (a) is a back view of the drag device in which a pressure member and a removal preventive member are superimposed on an operation member, and FIG. 6 (b) is a back view thereof in which a removal preventive member is rotatably secured to an operation member.

The second embodiment is substantially similar to the first embodiment except that it does not include the pin-like projections 7h provided right and left of the securing portion 7g of the operation member 7 according to the first embodiment. Especially, the operation member 7 and pressure member 6 are almost identical with those employed in the first embodiment.

A removal preventive member 9' includes a plurality of recessed portions 9e each of which is greater in width than the recessed portion 9a having the engaging portion 9b formed therein in the first embodiment. An engaging portion 9b is formed in one side portion of the wider recessed portion 9e.

In the second embodiment, to secure the engaging portion 9b of the removal preventive member 9' to the securing portion 7g of the operation member 7, at first, if the removal preventive member 9' is superimposingly assembled to the stepped portion 7c of the operation member 7 and the removal preventive member 9' is rotated, then the engaging portion 9b is secured by means of the elastic deformation of the securing portion 7g so that the pressure member 6 can be secured to the operation member 7 rotatably but unremovably.

Figure 7:
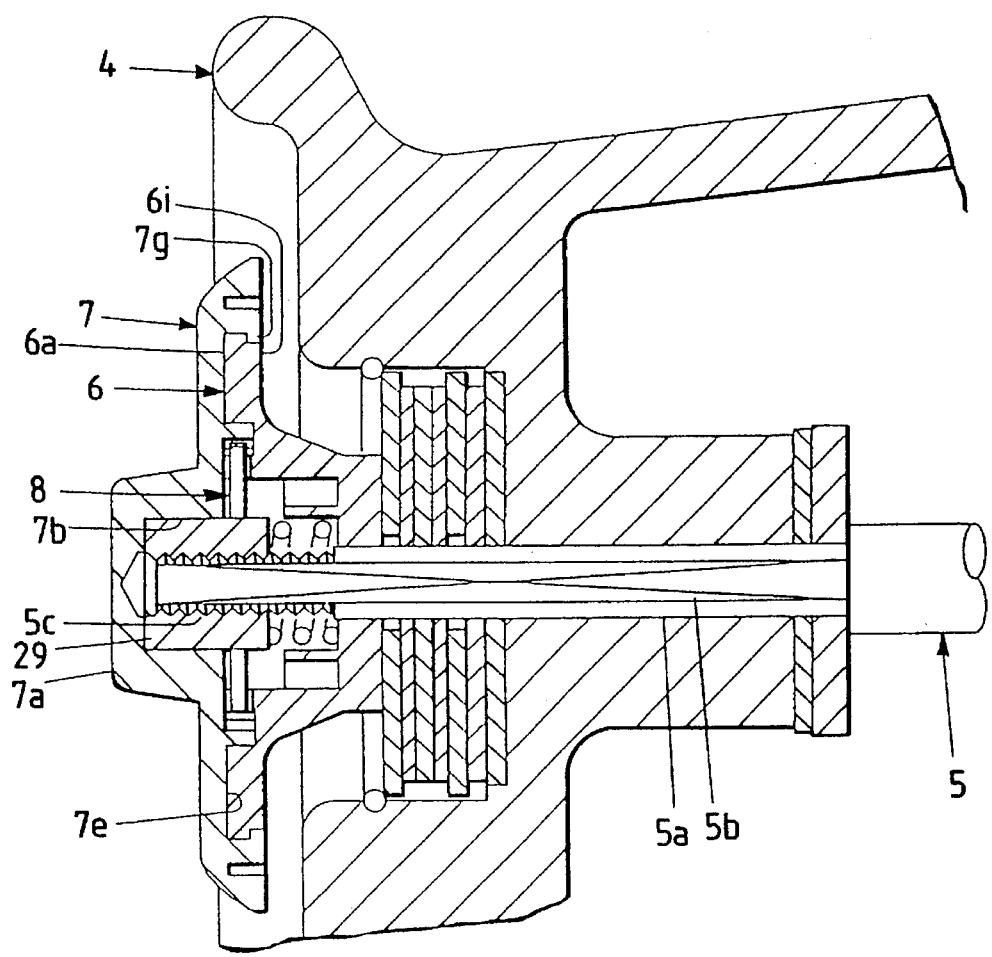
FIG. 7 is an enlarged sectional side view of a third embodiment of a drag device disposed within a spool.
Figure 8:
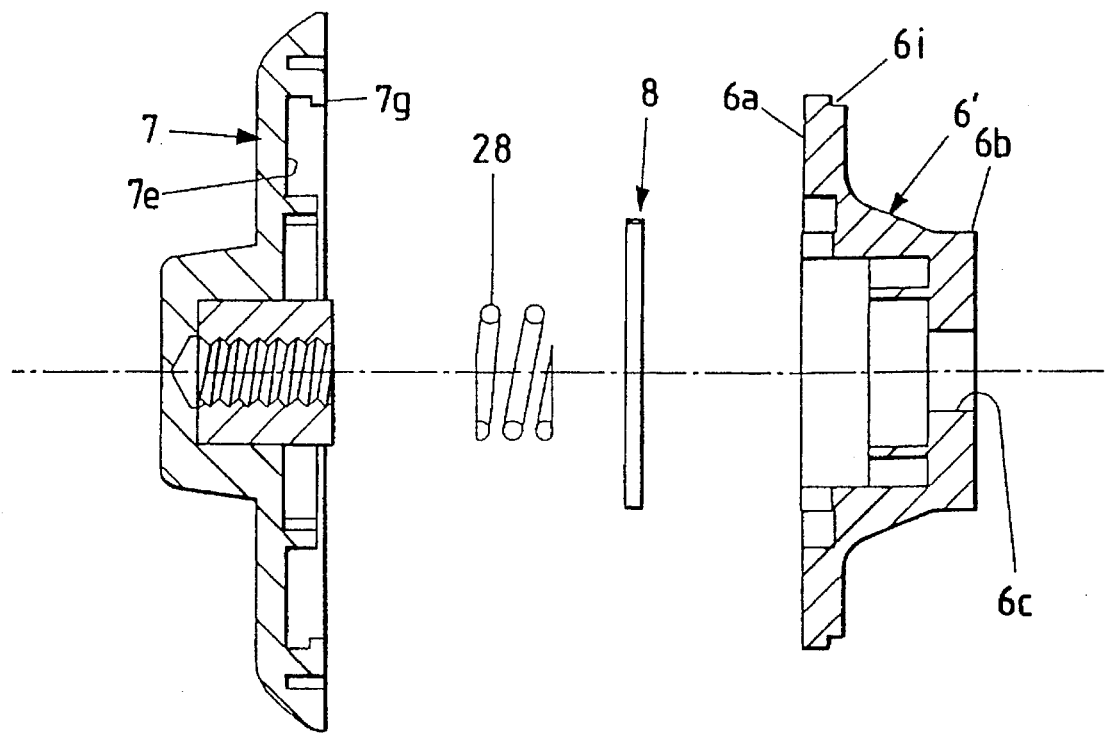
FIG. 8 is an exploded sectional side view of the main portions of the third embodiment; and, FIG. 9 is a back view of the above drag device.
Figure 9:
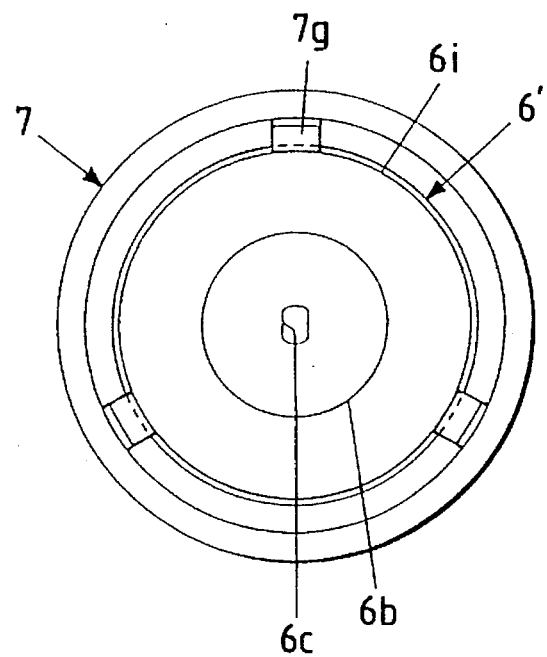

Referring now to FIGS. 7 to 9, there is shown a third embodiment of a drag device according to the invention. In particular, FIG. 7 is an enlarged sectional side view of a drag device disposed within a spool, FIG. 8 is an exploded sectional side view of the main portions of the drag device, and FIG. 9 is a back view of the drag device.

In the third embodiment, a removal preventive member is not used but a pressure member 6' is rotatably secured to the operation member 7 in such a manner that it is prevented against removal from the operation member 7.

The operation member 7 is substantially identical with that employed in the first embodiment, except that there is omitted the stepped portion 7c provided on the inner side of the back surface thereof in the first embodiment. The pressure member 6' includes a flange portion 6a and a stepped engaging portion 6i is formed on the rear surface of the outer peripheral portion of the flange portion 6a. The shape of the remaining portions of the pressure member 6' is substantially identical with that of the first embodiment.

In the third embodiment, to secure the engaging portion 6i of the pressure member 6' to the securing portion 7g of the operation member 7, if the flange portion 6a of the pressure member 6' is fitted into the recessed portion 7e of the operation member 7, then the engaging portion 6i is secured by means of the elastic deformation of the securing portion 7g so that the pressure member 6' can be secured to the operation member 7 rotatably but unremovably.

Figure 10:
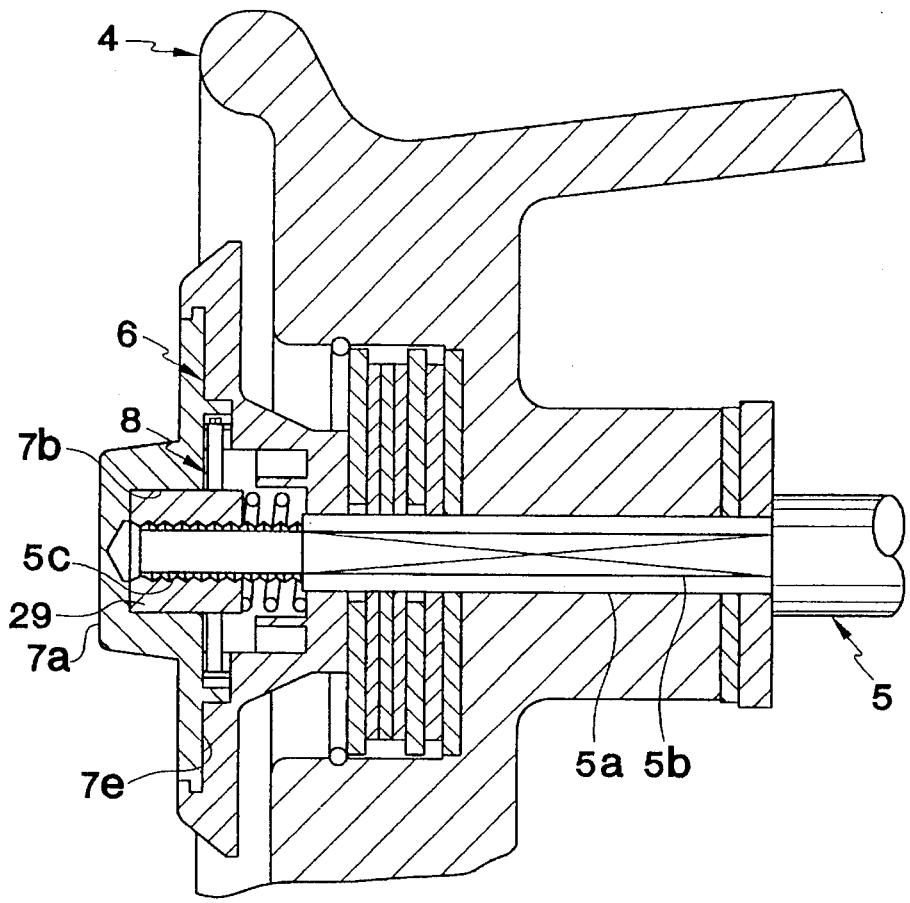
FIG. 10 is an enlarged sectional side view of a fourth embodiment of a drag device within a spool.
Figure 11:
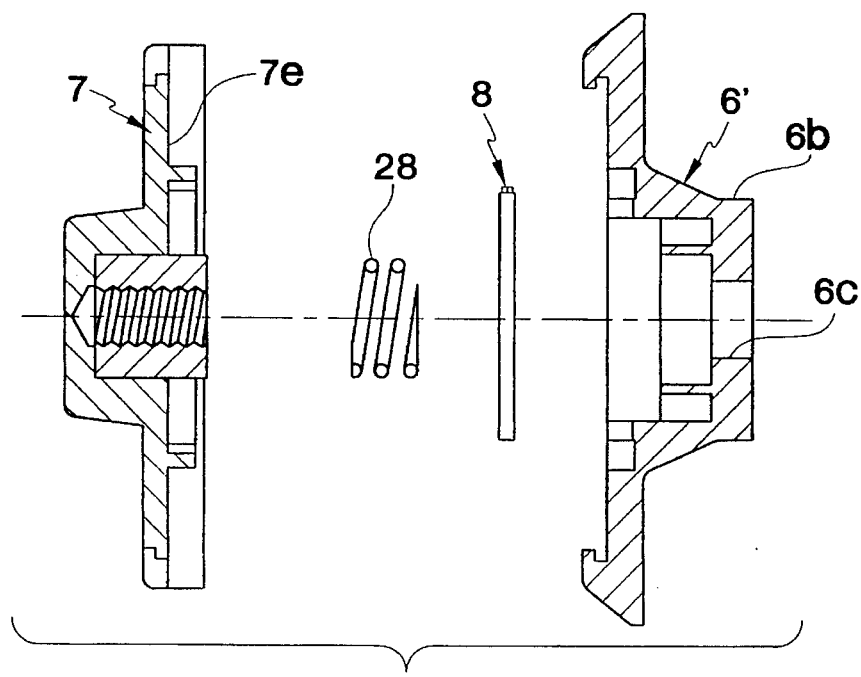
FIG. 11 is an exploded sectional side view of the main portions of the fourth embodiment.

FIGS. 10 and 11 illustrate a fourth embodiment of the invention, wherein the hooked projections are formed on the pressure member 6 rather than the operation member 7. The remaining structure of the embodiment shown in FIGS. 10 and 11 is identical to the corresponding elements shown in FIGS. 7–9.

Since the present invention is structured in the above-mentioned manner, that is, since the present drag device is assembled by securing the removal preventive member or the engaging portion of the pressure member to the securing portion of the operation member by means of elastic deformation, the drag device is very easy to assemble, requires a reduced number of parts, and does not use any corrosive parts on the outside portion thereof to thereby enhance the corrosion resistance thereof, so that it can keep its commercial value. That is, the invention can supply a drag device for use in a fishing spinning reel which provides practically excellent effects.

What is claimed is:

1. A drag device for a spinning reel having a spool rotatably mounted on a spool shaft, said device comprising:

a braking plate accommodated in a spool;

a pressure means non-rotatably and axially movably mounted on said spool shaft for depressing said braking plate against said spool;

an operation member threadingly engaged with said spool shaft for controlling the depression of said pressure means against said braking plate; and elastic means coupling said pressure means with said operation member, permitting said operation member to rotate with respect to said pressure means and prevent said operation member from being axially removed from said pressure means, said elastic means including at least one hooked projection formed on one of said pressure means and said operation member, and being elastically deformable to retain said pressure means on said operation member, wherein said at least one hooked projection overlies a radially outer peripheral edge of one of said pressure means and said operation member to retain said pressure means on said operation member.

2. The device according to claim 1, wherein said hooked projection is formed on said operation member, and said pressure means includes a pressure member and a removal preventive member engageable with said hooked projection, a portion of said pressure member being interposed between said removal preventive member and said operation member when said hooked projection elastically engages said removal preventive member.

3. The device according to claim 2, wherein said removal preventive member comprises a removable annular plate having a notch at its outer peripheral portion, said notch being engageable with said hooked projection so that said removal preventive member is non-rotatably retained on said operation member.

4. The device according to claim 2, wherein said removable preventive member comprises a removable annular plate having a notch at its outer peripheral portion, said notch defining a first portion through which said hooked projection passes without any elastic deformation and a second portion adjoining with said first portion and engageable with said hooked projection after passing through said first portion.

5. The device according to claim 1, wherein said pressure means further includes a step encircling its entire periphery, said hooked projection being formed on said operation member and being elastically engaged with said step to permit said operation member to rotate with respect to said pressure means.

* * * * *